US 6,678,024 B2

(12) United States Patent
Kim (10) Patent No.: US 6,678,024 B2
(45) Date of Patent: Jan. 13, 2004

(54) LIQUID CRYSTAL DISPLAY DEVICE HAVING CHOLESTERIC LIQUID CRYSTAL COLOR FILTER (75) Inventor: Yong-Beom Kim, Kyonggi-do (KR)

(73) Assignee: LG.Philips LCD Co., Ltd., Seoul (KR)

( * ) Notice: Subject to any disclaimer, the term of this patent is extended or adjusted under 35 U.S.C. 154(b) by 191 days.

(21) Appl. No.: 09/780,671

(22) Filed: Feb. 12, 2001

(65) Prior Publication Data
US 2001/0017680 A1 Aug. 30, 2001

(30) Foreign Application Priority Data
Feb. 10, 2000 (KR) .......................... 2000-6225

(51) Int. Cl.⁷ ................. G02F 1/1347; G02F 1/1333; G02F 1/133; G02F 1/1337
(52) U.S. Cl. .................. 349/106; 349/76; 349/96; 349/102; 349/115; 349/130; 430/7
(58) Field of Search ................ 349/106, 76, 96, 349/102, 115, 130; 430/7

(56) References Cited

U.S. PATENT DOCUMENTS

| 5,583,676 | A | * | 12/1996 | Akiyama et al. .............. 349/28 |
| 5,602,662 | A | * | 2/1997 | Rosenblatt et al. ......... 349/130 |
| 5,798,808 | A | * | 8/1998 | Van Haaren et al. ......... 349/96 |
| 5,833,339 | A | * | 11/1998 | Sarayeddine .................. 353/20 |
| 6,177,216 | B1 | * | 1/2001 | Broer et al. .................... 430/7 |
| 6,188,455 | B1 | * | 2/2001 | Yamamoto .................... 349/76 |
| 6,433,845 | B1 | * | 8/2002 | Suzuki et al. ............... 349/102 |

* cited by examiner

Primary Examiner—Julie Ngo
(74) Attorney, Agent, or Firm—Morgan Lewis & Bockius LLP (57) ABSTRACT

A liquid crystal display device includes first and second substrates spaced apart from each other with a liquid crystal therebetween. The liquid crystal display device adopts a cholesteric liquid crystal color filter. Each portion of the cholesteric liquid crystal color filter is designed to have an adjusted order parameter according to a wavelength of a corresponding color ray. Therefore, with the variously adjusted order parameters of the cholesteric liquid crystal color filter, an increase of the color shift due to a longer wavelength is prevented.

22 Claims, 8 Drawing Sheets

LIQUID CRYSTAL DISPLAY DEVICE HAVING CHOLESTERIC LIQUID CRYSTAL COLOR FILTER

This application claims the benefit of Korean Patent Application No. 2000-6225, filed on Feb. 10, 2000, which is hereby incorporated by reference.

BACKGROUND OF THE INVENTION

1. Field of the Invention

The present invention relates to a reflective liquid crystal display device, and more particularly to a liquid crystal display device having a cholesteric liquid crystal color filter.

2. Discussion of the Related Art

LCD devices are usually classified into transmissive type and reflective type according to their difference in a light source.

The transmissive LCD device uses light incident from a back light that is attached to a rear surface of a liquid crystal panel. The light is incident to a liquid crystal layer of the liquid crystal panel, and is absorbed or passes through the liquid crystal layer according to different alignments of the liquid crystal layer. Therefore, dark or white mode is operated by the liquid crystal panel. Conventionally, the back light of the transmissive LCD device is an artificial light source. Therefore, high power consumption due to the back light is a greater disadvantage of the transmissive LCD device.

On the contrary to the above-mentioned transmissive LCD device, the reflective LCD device uses an ambient light incident from a natural light source or an exterior artificial light source. Because of its low power consumption, the reflective LCD device is focused on.

Figure 1:
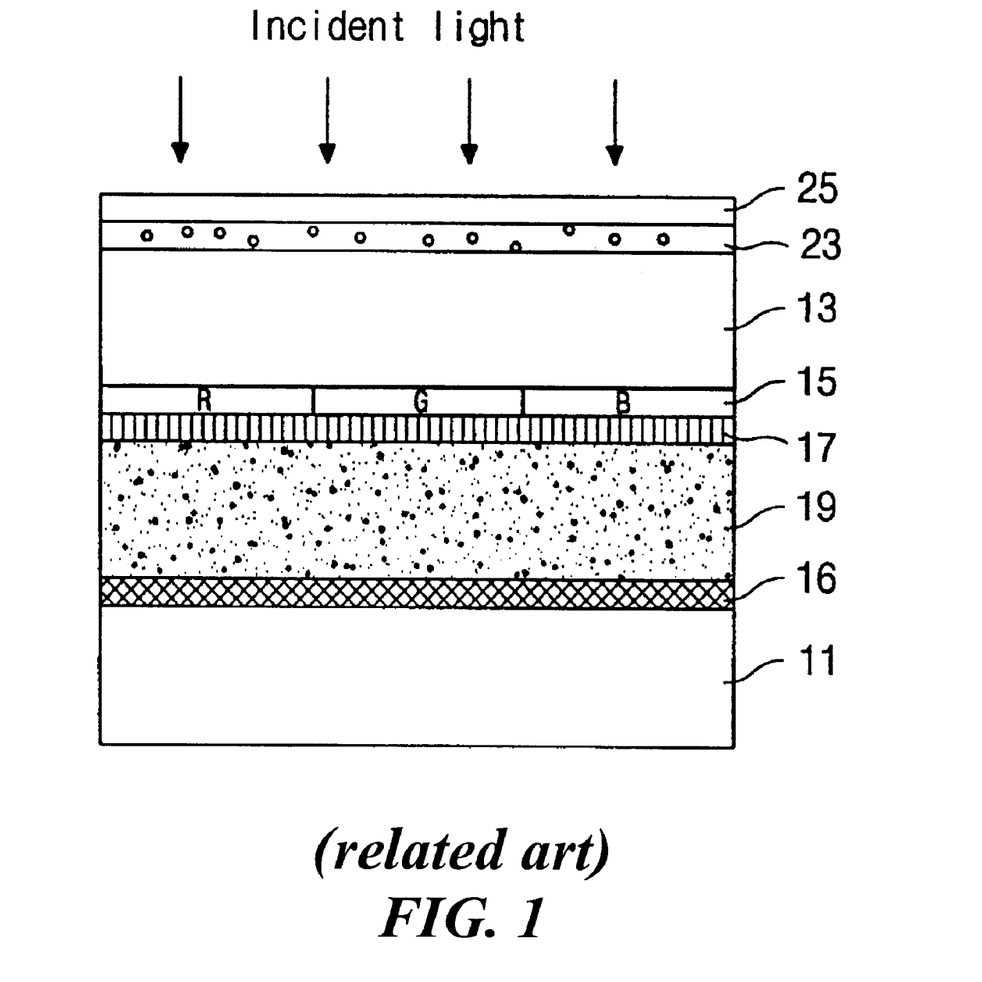
FIG. 1 is a conceptual cross-sectional view illustrating a reflective liquid crystal display device according to the related art.

FIG. 1 is a cross-sectional view of a conventional reflective color LCD device.

As shown, upper substrate 13 includes a color filter 15 and a common electrode 17, and a lower substrate 11 includes a reflective electrode 16. Between the upper and lower substrates 13 and 11, a liquid crystal layer 19 is interposed between. Since the liquid crystal layer 19 has an optical anisotropy, molecules of the liquid crystal layer 19 are aligned in a proper direction with an electric field applied there-across. Therefore, an incident light to the liquid crystal layer 19 is controlled by the electric field applied across the liquid crystal layer 19 via the common and reflective electrodes 17 and 16. Instead of the liquid crystal layer 19, a certain medium having the optical anisotropy may be used for an LCD device.

On each exterior surface of the upper and lower substrates 13 and 11, a plurality of layers are formed to control a polarization of the incident light. For example, a retardation layer 23, and a polarizer 25 are sequentially formed on the exterior surface of the upper substrate 13. The retardation layer 23, or a quarter wave plate (QWP), makes an incident light right-circularly polarized (RCP) or left-circularly polarized (LCP). The polarizer 25 serves to pass only a portion of an incident light that corresponds to a transmittance axis direction of the polarizer 25. Other portions of the incident light that are different from the transmittance axis direction of the polarizer 25 are absorbed by the polarizer 25. At this point, a RCP ray is a right-circularly polarized ray that goes from a viewer, while an LCP ray is a left-circularly polarized ray that goes from the viewer.

A twisted nematic (TN) liquid crystal is typically used for the liquid crystal layer 19 between the upper and lower substrates 13 and 11. Long axes of the TN liquid crystal molecules are twisted to 90 degrees, and the TN liquid crystal layer is designed to have a phase difference (phase delay) of "$\lambda/4$".

Figure 2A:
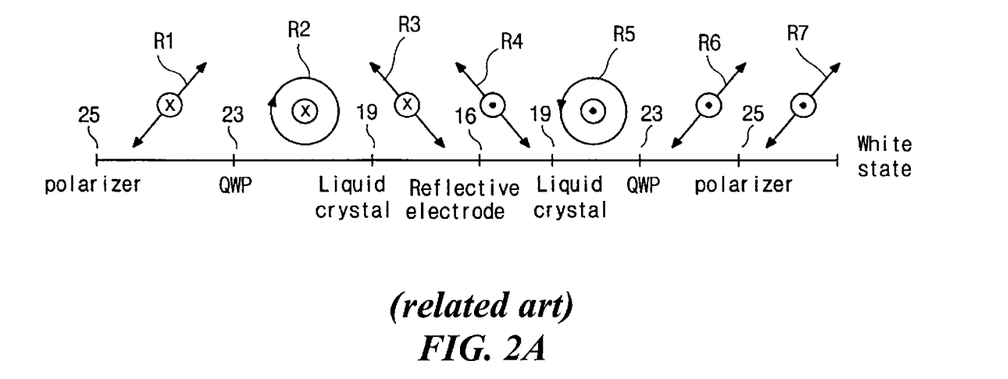
FIGS. 2A and 2B respectively illustrate off and on states of the conventional reflective LCD device shown in FIG. 1.

Now, with reference to FIGS. 2A and 2B, "on and off" states of the conventional reflective LCD device shown in FIG. 1 will be explained. FIG. 2A shows a passage of an incident light in the conventional reflective LCD device during its off state. At this point, a viewer (not shown) viewing the incident light is fixed at one position. A symbol "x" of ray denotes that the ray proceeds from the viewer, while another symbol "·" of ray denotes that the ray proceeds toward the viewer.

The incident light shown in FIG. 1 first meets the polarizer 25. As the light passes through the polarizer 25, it is linearly polarized. A first linearly polarized ray "R1" meets the retardation layer 23, passes through it, and becomes a first right-circularly polarized (RCP) ray "R2". The RCP ray R2 further meets the liquid crystal layer 19, passes through it, and becomes a second linearly polarized light "R3". Thereafter, the reflective electrode 16 reflects the second linearly polarized light R3 such that the second linearly polarized ray R3 change its direction and meets the liquid crystal layer 19 again. As a reflected ray R4 that has the opposite direction to the second linearly polarized ray R3 passes through the liquid crystal layer 19, the reflected ray R4 is right-circularly polarized with the phase difference of $\lambda/4$. At this point, a second RCP ray "R5" is shown to rotate left and to proceed to the viewer. Then, the second RCP ray R5 meets the retardation layer 23, passes through it, and becomes a third linearly polarized ray "R6". Since the third linearly polarized ray "R6" is parallel with the transmittance axis direction of the polarizer 25, it passes through the polarizer 25. Therefore, in the off state, the conventional reflective LCD device operates the white state.

Now, the TN liquid crystal layer 19 is on state such that molecules thereof arrange in one direction, for example perpendicular to the substrates 11 and 13, corresponding to an electric field applied across the TN liquid crystal layer 19. Therefore, the TN liquid crystal layer 19 is homeotropic-aligned.

Figure 2B:
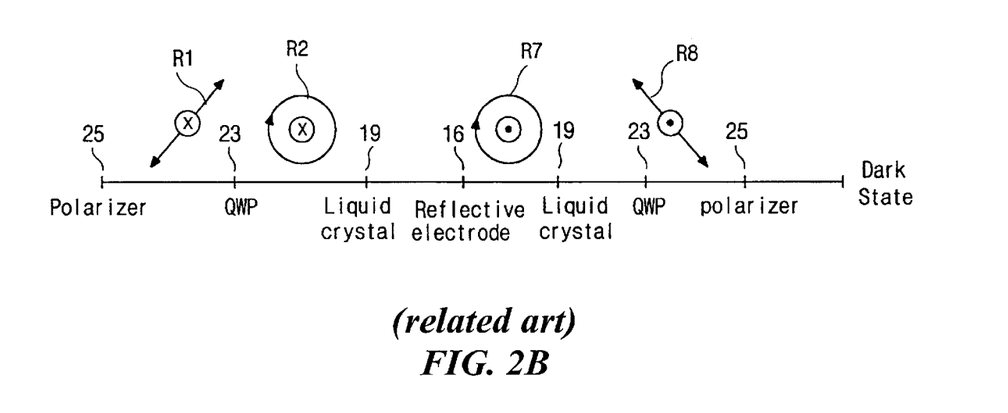

In FIG. 2B, the incident light becomes the first RCP ray R 2 after it sequentially passes through the polarizer 25 and the retardation layer 23. This is the same as shown in FIG. 2A. Thereafter, since the TN liquid crystal layer 19 is on state, the first RCP ray R2 passes through the TN liquid crystal layer 19 without rotation and phase difference. Then, the reflective electrode 16 reflects the first RCP ray R2 such that it changes its direction to be a left-circular polarized (LCP) ray R7. The LCP ray R7 passes through the TN liquid crystal 19 that is still on state without rotation and phase difference, and meets the retardation layer 23. After the LCP ray R7 passes through the retardation layer 23, it is linearly polarized. At this point, a fourth linearly polarized ray R8 is perpendicular to the transmittance axis direction of the polarizer 25, and thus us absorbed by the polarizer 25. Accordingly, in its on state, the conventional reflective LCD device operates a dark state.

Rays passing through the color filter 15 have colors corresponding to the color of the color filter 15, for example red (R), green (G), and blue (B). When the conventional reflective LCD device is off state, a ray having a color passes through the polarizer 25 and displays the color. However, when the conventional reflective LCD device is on state, a ray having a color is absorbed by the polarizer 25 and does not display the color. Therefore, portions of the liquid crystal layer 19 respectively corresponding to colors of the color filter 15 are selectively on or off to display a color image.

However, in the above-mentioned conventional reflective LCD device, the incident light passes through too many layers. Whenever meeting new layers, or new mediums having different refractive indexes, each ray is somewhat reflected and absorbed by the new medium. Therefore, whenever passing through a new layer, the ray is weakened. For example, as the incident light passes through the polarizer 25, it is weakened for the first time. Further, as a ray passes through the reflective electrode 15, it is not only reflected but also absorbed and rapidly weakened.

In another aspect, color dispersion property and contrast ratios of the conventional reflective LCD device rapidly vary with respect to a viewing angle. That is to say, when a user looks at a color image displayed on the conventional reflective LCD device in a wide viewing angle, colors of the color image are shown shifted to different colors with a low contrast ratio.

SUMMARY OF THE INVENTION

Accordingly, the present invention is directed to a reflective LCD device that substantially obviates one or more of the problems due to limitations and disadvantages of the related art.

An aspect of the present invention is to provide a reflective LCD device having low color dispersion and high contrast ratio in a wide range of a viewing angle.

It is to be understood that both the foregoing general description and the following detailed description are exemplary and explanatory and are intended to provide further explanation of the invention as claimed.

BRIEF DESCRIPTION OF THE DRAWING

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the illustrated embodiments of the present invention, the examples of which are shown in the accompanying drawings.

First Preferred Embodiment

A reflective LCD device according to the first preferred embodiment includes a liquid crystal layer that is homeotropic-aligned in off state, and a cholesteric liquid crystal color filter that is designed to have different order parameters according to colors.

Figure 3:
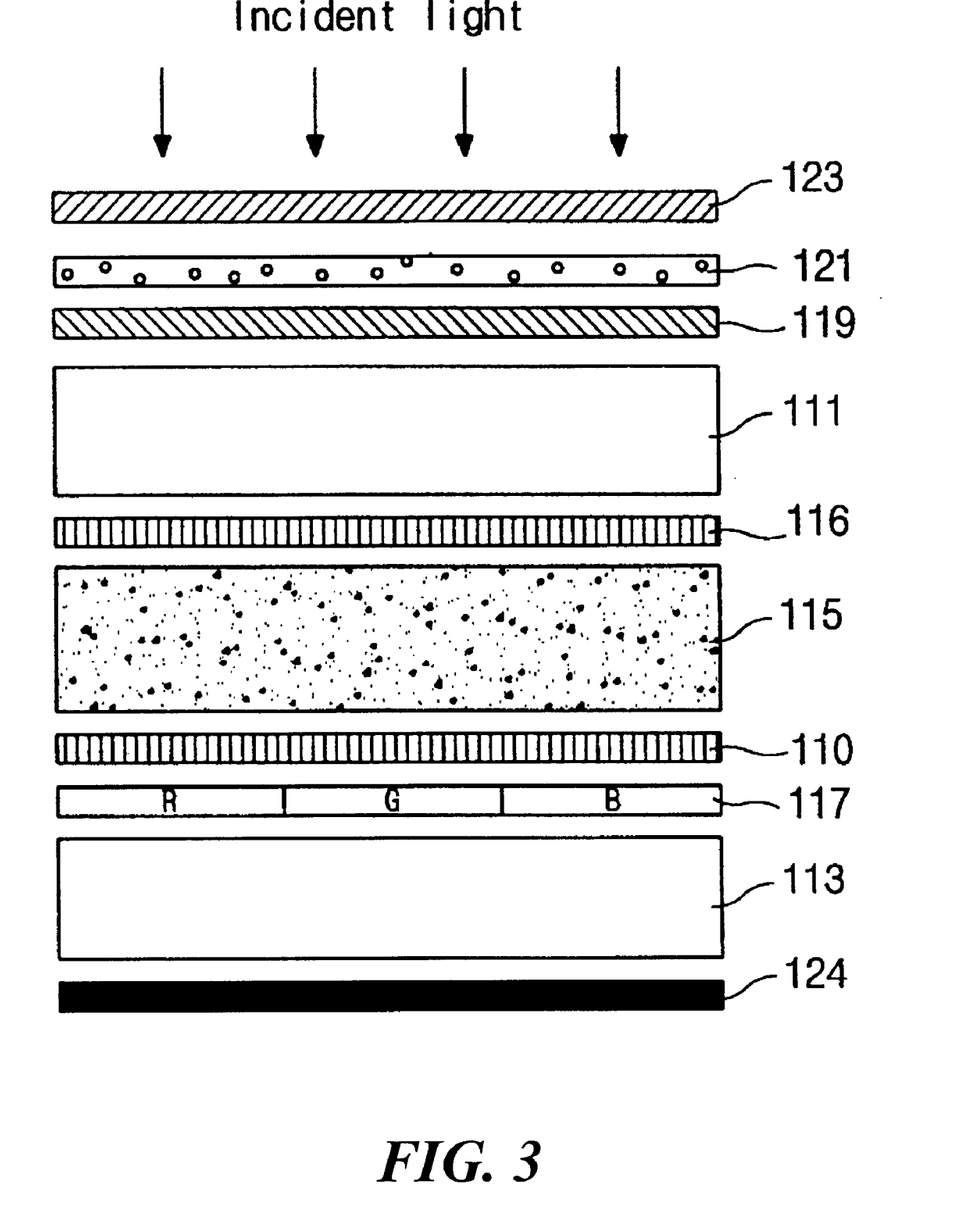
FIG. 3 is a conceptual cross-sectional view illustrating a reflective LCD device according to a first preferred embodiment of the present invention.

As shown in FIG. 3, between upper and lower substrates 111 and 113, a liquid crystal layer 115 is interposed. A retardation layer 121, a polarizer 123, and a negative uniaxial film 119 are sequentially formed on an exterior surface of the upper substrate 111. The negative uniaxial film 119 serves to compensate for viewing angle and color dispersion. On an opposing surface of the lower substrate 113, the cholesteric liquid crystal color filter 117 is formed, while a black layer 124 is formed on an exterior surface of the lower substrate 113. The black layer 124 preferably includes polymer to absorb light. A transparent pixel electrode 110 is formed to face the liquid crystal layer 115 on the color filter 117, while a transparent common electrode 116 is formed on an opposing surface of the upper substrate 111 to face the liquid crystal layer 115. The pixel and common electrodes 110 and 116 serve to apply an electric field across the liquid crystal layer 115. Preferably, the pixel and common electrodes 110 and 116 are selected from a group consisting of indium tin oxide (ITO) and indium zinc oxide (IZO).

In the "off" state, where there is no electric field applied to the liquid crystal layer 115, long axes of the liquid crystal molecules are aligned perpendicular to the substrates 111 and 113. Whereas, in the "on" state, where there is an electric field applied across the liquid crystal layer 115, the long axes of the liquid crystal molecules are aligned parallel with the substrates 111 and 113.

The cholesteric liquid crystal color filter 117 adopts a cholesteric liquid crystal to involve reflection or transmission of light selectively. Specifically, when a molecular structure of the cholesteric liquid crystal is twisted right, the cholesteric liquid crystal color filter 117 reflects only a right-circular polarized (RCP) ray. Whereas, when the molecular structure of the cholesteric liquid crystal is twisted left, the cholesteric liquid crystal color filter 117 reflects only a left-circular polarized (LCP) ray.

The above-mentioned selective reflection of the cholesteric liquid crystal color filter 117 is dependent on a pitch of the cholesteric liquid crystal molecules. Among visible rays having a wavelength range of about 400 to 700 nanometers (nm), red ray corresponds to 660 nm in its wavelength, green ray to 530 nm, and blue ray to 470 nm. When the pitch of the cholesteric liquid crystal molecules is adjusted to correspond to the wavelength of a particular color ray, the cholesteric liquid crystal color filter reflects only the corresponding color ray. Therefore, a highly pure color is displayed. Specifically, three color portions of red, green and blue (R, G, and B) are formed in the cholesteric liquid crystal color filter 117 such that a color image is displayed using the above-mentioned pitch property of the cholesteric liquid crystal.

However, the above-mentioned cholesteric liquid crystal color filter involves a problem of color shifts according to viewing angles. As the wave of a visible ray is longer, the color shift is larger, which means that a color dispersion property is poor.

The above-mentioned result is inferred from a relation between the color shift and the order parameter of the cholesteric liquid crystal molecules. The order parameter is a degree of order for a molecular alignment. Therefore, the order parameter shows how far the molecules diverge from a homeotropic alignment having a normal direction to the substrates. Specifically, not all the liquid crystal molecules are aligned in one direction. A perfect homogeneous alignment where all the molecules are aligned parallel with the substrates and a perfect homeotropic alignment where all the molecules are aligned perpendicular to the substrates are just an ideal state. In other words, an alignment rate or level of the liquid crystal molecules is decreased by a thermal motion of each molecule, and is further affected by a structure or a configuration of the molecules. Physical properties of the liquid crystal, for example a refractive index, a dielectric coefficient, and a magnetic coefficient and the like, are directly dependent on the alignment rate of the liquid crystal molecules.

The alignment rate of the liquid crystal molecules is expressed by the order parameter "S" having a relation as:

$$S = \tfrac{1}{2}(3\cos^2\Theta - 1),$$

where the angle $\Theta$ is an angle of a long axis of a molecule with respect to a director or a unit vector $\hat{\eta}$ denoting a macroscopic direction of the long axes of the liquid crystal molecules. At this point, the value in the brackets is a mean value calculated throughout the overall liquid crystal molecules.

Figure 4A:
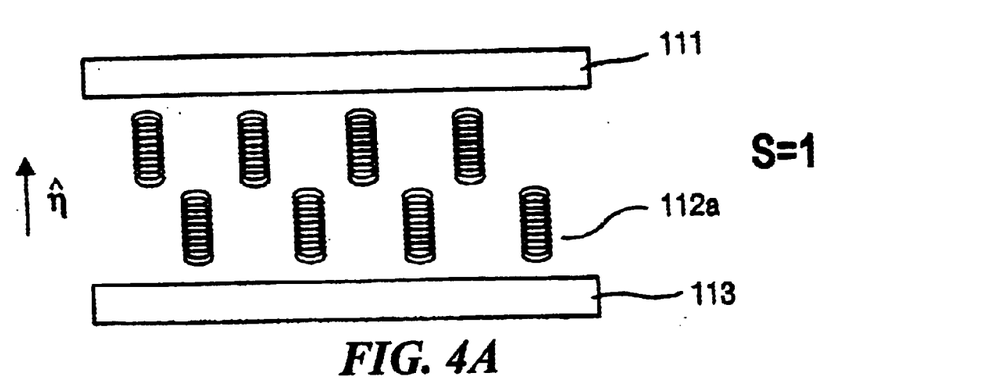
FIGS. 4A and 4B show different molecular alignments where an order parameter of the cholesteric liquid crystal is 1 and less than 1, respectively.
Figure 4B:
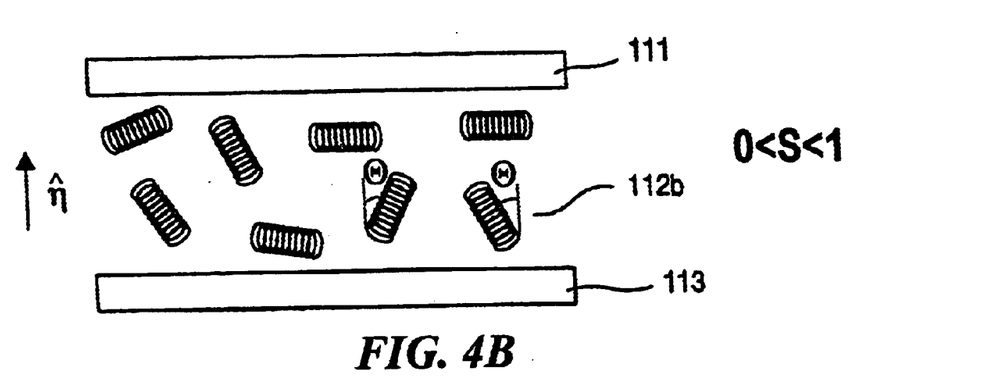

If the order parameter S is zero (S=0), the liquid crystal has the same state as an isotropic liquid where long axes of the molecules are perfectly dispersed. On the contrary, if the order parameter S is just one (S=1), all the molecules are perfectly homogeneous-aligned parallel with the substrates. Both of the above-mentioned cases are an ideal state. FIGS. 4A and 4B show some alignments of the cholesteric liquid crystal molecules. In FIG. 4A, ordered cholesteric liquid crystal molecules 112a are aligned perpendicular to the substrates 111 and 113 such that the order parameter S is just one (S=1). However, in FIG. 4B, since disordered cholesteric liquid crystal molecules 112b are arbitrarily aligned between the substrates 111 and 113, the order parameter S is between 0 and 1 (0<S<1).

When the order parameter S is between 0 and 1 exclusive (0<S<1), the color shift of the cholesteric liquid crystal becomes larger for a longer wave ray. Therefore, with an order parameter smaller than one, the color shift is more involved with the red ray having the wavelength of 660 nm than the green ray of 530 nm or the blue ray of 470 nm.

To overcome the above-mentioned problem, a portion of the cholesteric liquid crystal color filter corresponding to the longer wave ray is designed to have a preferably adjusted order parameter according to the wavelength of the ray. Therefore, with the adjusted order parameters of the cholesteric liquid crystal color filter, an increase of the color shift according to a longer wavelength is prevented.

Figure 5A:
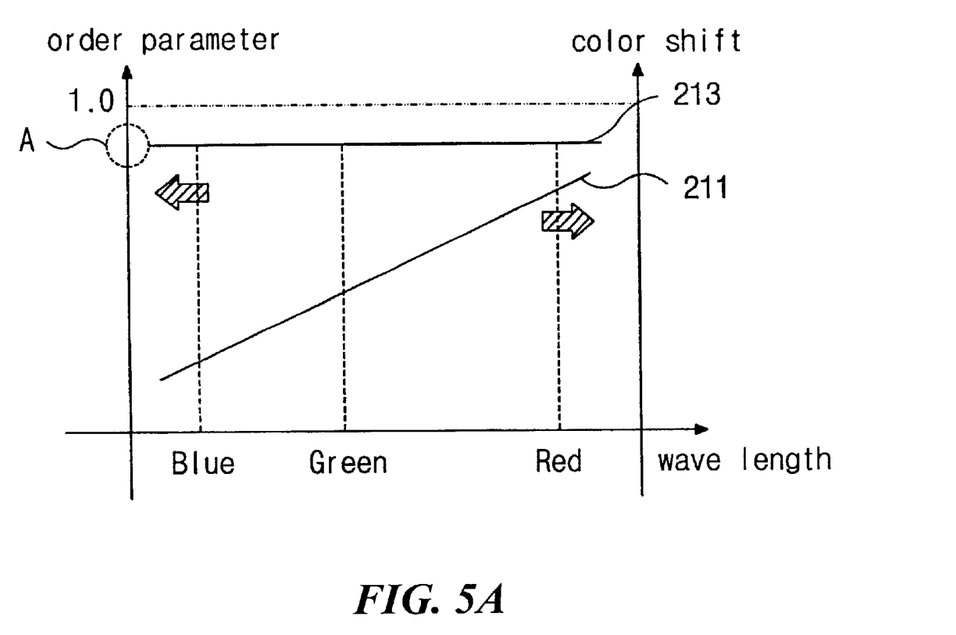
FIG. 5A shows a varying color shift property of a cholesteric liquid crystal color filter when an order parameter of the cholesteric liquid crystal color filter is fixed regardless of different wavelengths of different color rays.

FIG. 5A shows the relation between the order parameter and color shift of a conventional cholesteric liquid crystal color filter, which has different portions to respectively reflect the red, green, and blue rays of different wavelengths. As shown, when the order parameter 213 of the cholesteric liquid crystal is fixed to a certain value "A" below one, the color shift 211 inclines from the blue ray to the red ray.

Figure 5B:
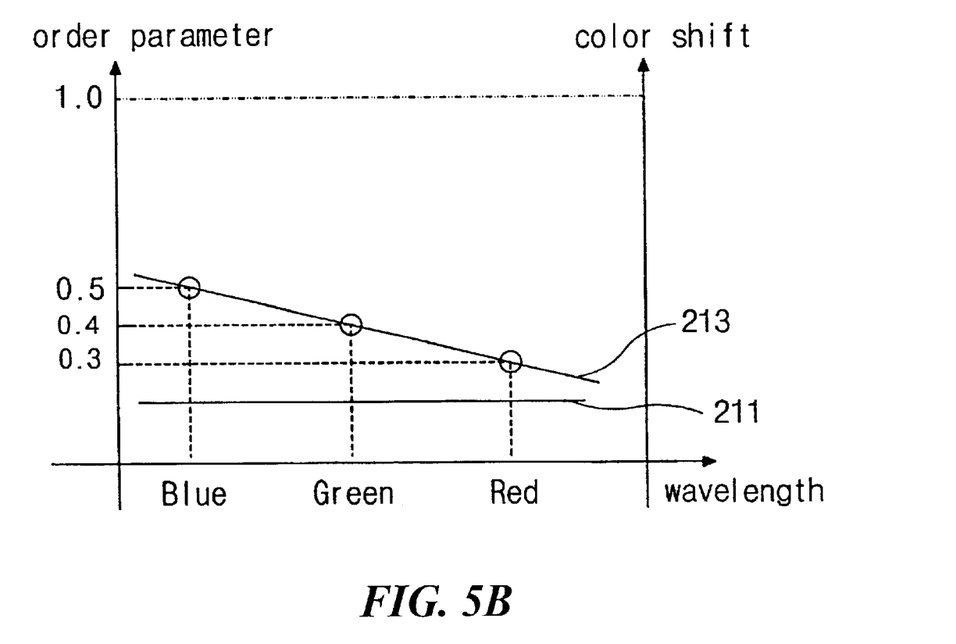
FIG. 5B shows a uniform color shift property of a cholesteric liquid crystal color filter when the order parameter of the cholesteric liquid crystal color filter is adjusted according to the wavelength of the color ray.

However, in FIG. 5B, the cholesteric liquid crystal color filter has different portions and each portion has a proper order parameter according to a corresponding wavelength. Specifically, a first portion of the cholesteric liquid crystal corresponding to the blue ray is designed to have a range of the order parameter between 0.5 and 0.9, preferably 0.5. A second portion of the cholesteric liquid crystal corresponding to the green ray is designed to have a range of the order parameter between 0.4 and 0.9, preferably 0.4. Further, a third portion of the cholesteric liquid crystal corresponding to the red ray is designed to have a range of the order parameter between 0.3 and 0.8, preferably 0.3. By changing the order parameter 213 preferably according to the corresponding wavelength, or the color ray, a uniformly low color shift 211 is achieved. Therefore, the color dispersion property of the reflective LCD device according to the first preferred embodiment is superior to that of the convention reflective LCD device.

In another aspect, the cholesteric liquid crystal color filter according to the first preferred embodiment preferably has varying order parameters according to the viewing angle, or the position on a display area of the LCD device. Therefore, to improve the viewing angle property, near edge portions of the cholesteric liquid crystal color filter preferably has the smaller order parameter than near center portions thereof. In short, since the cholesteric liquid crystal color filter has varying order parameters according to not only the corresponding color rays but also the viewing angles, the reflective LCD device according to the first preferred embodiment has a superior color dispersion property with the wide viewing angle.

The cholesteric liquid crystal color filter 117 according to the first preferred embodiment has the above-mentioned properties, and it is designed to transmit only the right-circularly polarized ray selectively. Hereinafter, with reference to FIGS. 6A and 6B, "off" and "on" states of the reflective LCD device according to the first preferred embodiment will be explained.

Figure 6A:
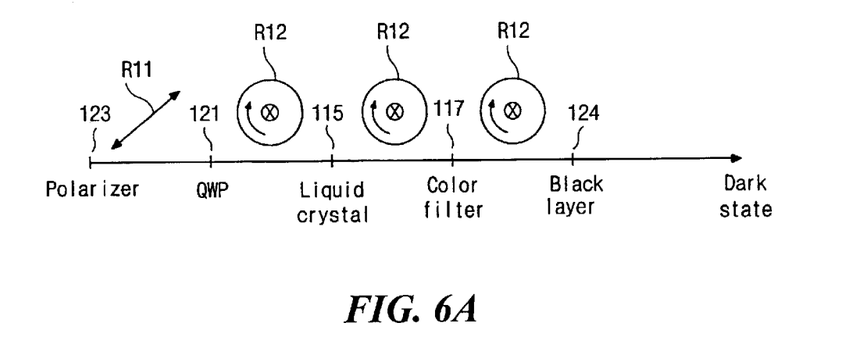
FIGS. 6A and 6B respectively illustrate off and on states of the inventive reflective LCD device shown in FIG. 3.

FIG. 6A shows the "on" state. As shown, the incident light shown in FIG. 3 first meets the polarizer 123 having a 45° transmittance axis direction. As the light passes through the polarizer 123, it is linearly polarized according to the transmittance axis direction of the polarizer 123. Therefore, a first linearly polarized ray R11 parallel with the transmittance axis direction of the polarizer 123 is incident on the retardation layer 23, passes through it, and becomes a first right-circularly polarized (RCP) ray R22. After the first RCP ray R22 passes through the negative uniaxial film (reference 119 of FIG. 3), it passes through the liquid crystal layer 115 where the molecules are aligned perpendicular to the substrates (reference 111 and 113 of FIG. 3). Thereafter, the first RCP ray R22 further passes through the cholesteric liquid crystal color filter 117 that transmits only the RCP ray, and are absorbed by the black layer 124. Therefore, in its "off" state, the reflective LCD device according to the first preferred embodiment operates a dark mode.

The negative uniaxial film (reference 119 of FIG. 3) severs to compensate for a phase of an oblique portion of the incident light on the polarizer 123. An oblique light having a certain angle with respect to a normal direction of the substrate is incident on the polarizer 123 and retardation layer 121, passes through them, and become right-circularly polarized. At this point, an oblique RCP ray of the oblique light is also oblique and makes some angle with the long axes of the liquid crystal molecules that are aligned perpendicular to the substrates. Therefore, a phase delay occurs for the oblique RCP ray because of the angle difference between the long axes of the liquid crystal molecules and the oblique RCP ray. Consequently, the oblique RCP ray differs from its first right-circularized polarized state and the liquid crystal layer reflects the deformed oblique RCP ray. At this point, as mentioned above, the negative uniaxial film compensates for the phase delay, or phase difference, of the first RCP ray such that the first RCP ray can pass through the liquid crystal layer without the above-mentioned reflection.

Figure 6B:
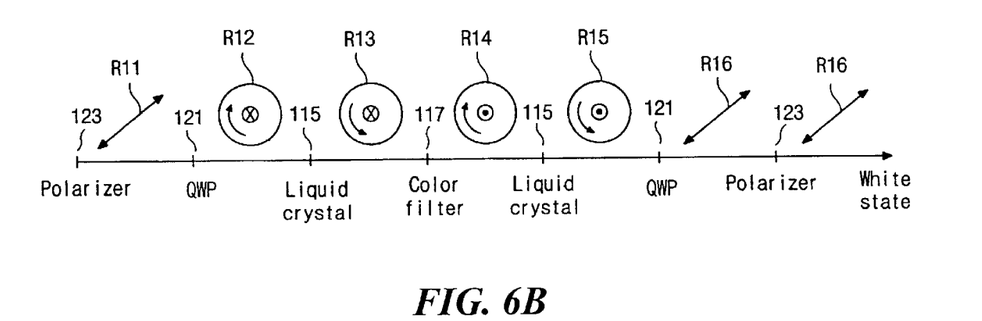

FIG. 6B shows the "on" state of the reflective LCD device according to the first preferred embodiment. When an electric field is applied across the liquid crystal layer 115, the liquid crystal molecules are aligned with their long axes parallel to the substrates (reference 111 and 113 of FIG. 3). The above-mentioned homogeneous alignment of the liquid crystal layer 115 makes a polarized direction of an incident ray reversed. As shown in FIG. 6B, the first RCP ray R12 sequentially passes through the negative uniaxial film and the liquid crystal layer 115. During passing through the liquid crystal layer 115, the first RCP ray R12 is reversed into a left-circularly polarized (LCP) ray R13 due to the homogeneous alignment of the liquid crystal layer 115.

Thereafter, the LCP ray R13 meets the cholesteric liquid crystal color filter 117, and the cholesteric liquid crystal color filter 117 reflects the LCP ray R13 for a reflected LCP ray R14. The reflected LCP ray R14 from the color filter 117 passes through the liquid crystal layer 115, and the liquid crystal layer 115 reverses it into a second RCP ray R15. The second RCP ray R15 meets the retardation layer 121, passes through it as a second linearly polarized ray R16 having the same vibration direction as the first linearly polarized ray R11. Since the second linearly polarized ray R16 corresponds to the transmittance axis direction of the polarizer 123, it passes through the polarizer 123 such that a white mode is operated.

The negative uniaxial film (reference 119 of FIG. 3) may be used for an inverted mode liquid crystal where molecules are homogeneous-aligned in the "off" state.

Second Preferred Embodiment

Figure 7:
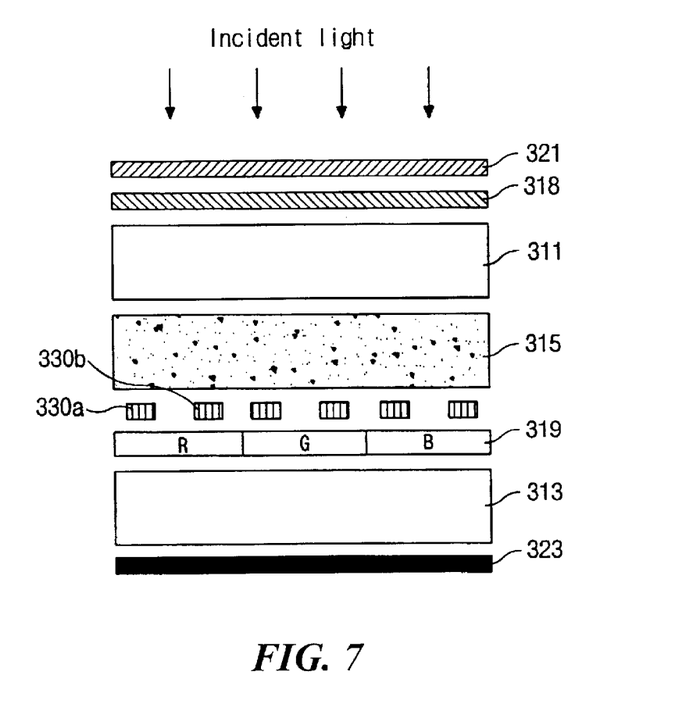
FIG. 7 is a conceptual cross-sectional view illustrating an IPS LCD device according to a second preferred embodiment of the present invention.

The second preferred embodiment of the present invention provides an in-plane-switching (IPS) LCD device adopting the above-described cholesteric liquid crystal color filter. As shown in FIG. 7, the IPS LCD device according to the second preferred embodiment includes upper and lower substrates 311 and 313, and a liquid crystal layer 315 interposed between the upper and lower substrates 311 and 313. A uniaxial film 318 and an upper polarizer 321 are sequentially formed on an exterior surface of the upper substrate 311. A black layer 323 is formed on an exterior surface of the lower substrate 313, while a cholesteric liquid crystal color filter 319 is formed on an opposing surface of the lower substrate 313.

The cholesteric liquid crystal color filter 319 preferably has the same characteristics as the cholesteric liquid crystal color filter according to the first preferred embodiment. Therefore, the cholesteric liquid crystal color filter 319 has various order parameters that are correspondingly adjusted according to a color of each portion of the color filter 319. In addition, the order parameter of each portion of the color filter 319 may be further adjusted according to a two-dimensional position of the portion in the display area.

Still referring to FIG. 7, over the cholesteric liquid crystal color filter 319, a plurality of common and pixel electrodes 330a and 330b, which are spaced apart from each other, are formed to apply an electric field parallel with the substrates 311 and 313. The common and pixel electrodes 330a and 330b are selected from a group consisting of indium tin oxide (ITO) and indium zinc oxide (IZO).

At this point, the liquid crystal layer 315 is, for example, a twisted nematic (TN) liquid crystal that reverses its twist direction according to an electric field applied parallel with the substrates 311 and 313. In its "off" state, the nematic liquid crystal layer 315 changes a linearly polarized ray into a left-circularly polarized ray, and vice versa. In its "on" state of an in-plane-switching mode, the liquid crystal layer 315 changes the linearly polarized ray into a right-circularly polarized ray, and vice versa.

The cholesteric liquid crystal color filter 319 reflects a left-circularly polarized (LCP) ray, but absorbs a right-circularly polarized ray (RCP), like the cholesteric liquid crystal color filter of the first preferred embodiment. Further, the black layer 323 preferably includes polymer to absorb light, and the uniaxial film 318 is preferably a negative uniaxial film.

Figure 8A:
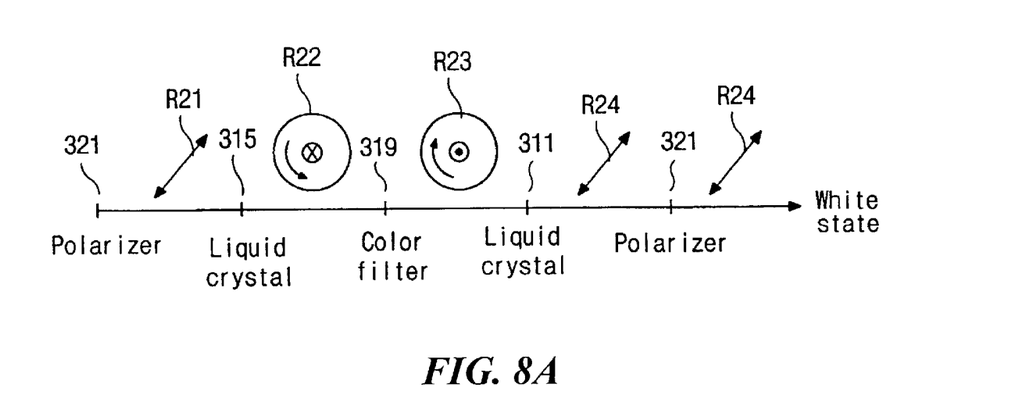
FIGS. 8A and 8B respectively illustrate off and on states of the inventive IPS LCD device shown in FIG. 7.
Figure 8B:
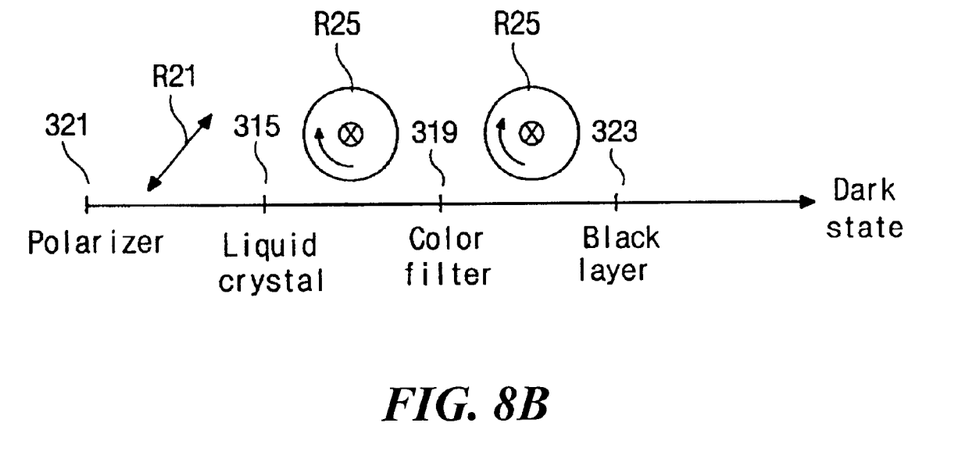

FIGS. 8A and 8B shows a passage of light, respectively, in "off" and "on" states of the IPS LCD device according to the second preferred embodiment.

As shown in FIG. 8A of the "off" state, an incident light shown in FIG. 7 passes through the polarizer 321 and becomes linearly polarized to be a first linearly polarized ray R21. Then, the first linearly polarized ray R21 sequentially passes through the uniaxial film 318 of FIG. 7 and the liquid crystal layer 315 such that a first LCP ray R22 having a phase difference of $\lambda/4$ is incident to the cholesteric liquid crystal color filter 319. The color filter 319 reflects the first LCP ray R22 and a reflected LCP ray R23 passes through the liquid crystal layer 315 such that a second linearly polarized ray R24 is incident therefrom. Since the second linearly polarized ray R24 has the same vibration direction as the first linearly polarized ray R21, it passes through the polarizer 321. Accordingly, a white mode is displayed.

FIG. 8B illustrates the "on" state. At this point, molecules of the liquid crystal layer 315 rotates to 90 degrees by the electric field applied parallel with the substrates 311 and 313. The liquid crystal layer 315 serves as a quarter wave plate to change a linearly polarized ray into an RCP ray with a phase difference of $\lambda/4$. Therefore, when the first linearly polarized ray R21 sequentially passes through the uniaxial film (reference 318 of FIG. 7) and the liquid crystal layer 315, it becomes a RCP ray R25. Then, the cholesteric liquid crystal color filter 319 transmits the RCP ray R25, and the black layer 323 absorbs the RCP ray R25. Accordingly, a dark mode is displayed. The uniaxial film serves to compensate for the phase of an oblique ray, as explained for the first preferred embodiment.

The above-mentioned correspondence between the white or dark mode and the "off" or "on" state of the liquid crystal layer depends on whether the liquid crystal layer has a negative anisotropy or a positive anisotropy.

Accordingly, the LCD devices according to the preferred embodiments of the present invention have superior color dispersion property with a wide viewing angle, by using the cholesteric liquid crystal color filter having the adjusted order parameters.

It will be apparent to those skilled in the art that various modifications and variation can be made in the method of manufacturing a liquid crystal display device according to the principles of the present invention without departing from the spirit or scope of the invention. Thus, it is intended that the present invention cover the modifications and variations of this invention provided they come within the scope of the appended claims and their equivalents.

What is claimed is:

1. A reflective liquid crystal display device comprising:
   upper and lower substrates;
   a liquid crystal layer between the upper and lower substrates;

a uniaxial film on the upper substrate;
a retardation layer superjacent to the uniaxial film;
a polarizer superjacent to the retardation layer;
first transparent electrode between the upper substrate and the liquid crystal layer;
second transparent electrode between the lower substrate and the liquid crystal layer;
a cholesteric liquid crystal color filter including first, second, and third portions under the second transparent electrode, each portion of the cholesteric liquid crystal color filter reflecting a different color ray; and
a black layer under the color filter,
wherein at least two of the first, second, and third portions of the cholesteric liquid crystal color filter have different order parameters.

2. The device of claim 1, wherein the liquid crystal layer includes a homeotropic alignment without an electric field, and a homogeneous alignment with an electric field applied across the liquid crystal layer.

3. The device of claim 1, wherein the liquid crystal layer includes a homogeneous alignment without an electric field, and a homeotropic alignment with an electric field applied across the liquid crystal layer.

4. The device of claim 1, wherein the first, second, and third portions of the color filter reflect blue, red, and green rays, respectively.

5. The device of claim 1, wherein an order parameter corresponding to the first portion of the color filter has a range of 0.5 to 0.9 inclusive both.

6. The device of claim 1, wherein an order parameter corresponding to the second portion of the color filter has a range of 0.3 to 0.8 inclusive both.

7. The device of claim 1, wherein an order parameter corresponding to the third portion of the color filter has a range of 0.4 to 0.9 inclusive both.

8. The device of claim 1, wherein the first electrode is selected from a group consisting of indium tin oxide (ITO) and indium zinc oxide (IZO).

9. The device of claim 1, wherein the second electrode is selected from a group consisting of indium tin oxide (ITO) and indium zinc oxide (IZO).

10. The device of claim 1, wherein the black layer includes a polymer.

11. The device of claim 1, wherein an order parameter of the cholesteric liquid crystal color filter is adjusted according to a position of the color filter.

12. The device of claim 1, wherein an order parameter of the cholesteric liquid crystal color filter decreases from about 1 to about 0 as a position of the cholesteric liquid crystal color filter moves from a center to edges of the upper substrate.

13. An IPS LCD device comprising:
upper and lower substrates;
a liquid crystal layer between the upper and lower substrates;
a uniaxial film on the upper substrate;
a polarizer superjacent to the uniaxial film;
first transparent electrode between the lower substrate and the liquid crystal layer;
second transparent electrode on a same plane as the first transparent electrode;
a cholesteric liquid crystal color filter including first, second, and third portions under the second transparent electrode, each portion of the cholesteric liquid crystal color filter reflecting a different color ray; and
a black layer under the color filter,
wherein at least two of the first, second, and third portions of the cholesteric liquid crystal color filter have different order parameters.

14. The device of claim 13, wherein the first, second, and third portions of the color filter reflect blue, red, and green rays, respectively.

15. The device of claim 13, wherein an order parameter corresponding to the first portion of the color filter has a range of 0.5 to 0.9 inclusive both.

16. The device of claim 13, wherein an order parameter corresponding to the second portion of the color filter has a range of 0.3 to 0.8 inclusive both.

17. The device of claim 13, wherein an order parameter corresponding to the third portion of the color filter has a range of 0.4 to 0.9 inclusive both.

18. The device of claim 13, wherein the first electrode is selected from a group consisting of indium tin oxide (ITO) and indium zinc oxide (IZO).

19. The device of claim 13, wherein the second electrode is selected from a group consisting of indium tin oxide (ITO) and indium zinc oxide (IZO).

20. The device of claim 13, wherein the black layer includes a polymer.

21. The device of claim 13, wherein an order parameter of the cholesteric liquid crystal color filter decreases from about 1 to about 0 as a position of the cholesteric liquid crystal color filter moves from a center to edges of the upper substrate.

22. The device of claim 13, wherein the liquid crystal layer includes a nematic liquid crystal.

* * * * *